March 23, 1971     H. NUSBAUM     3,572,122
MEASURING STICK TYPE GAUGE
Filed July 28, 1969     2 Sheets-Sheet 1
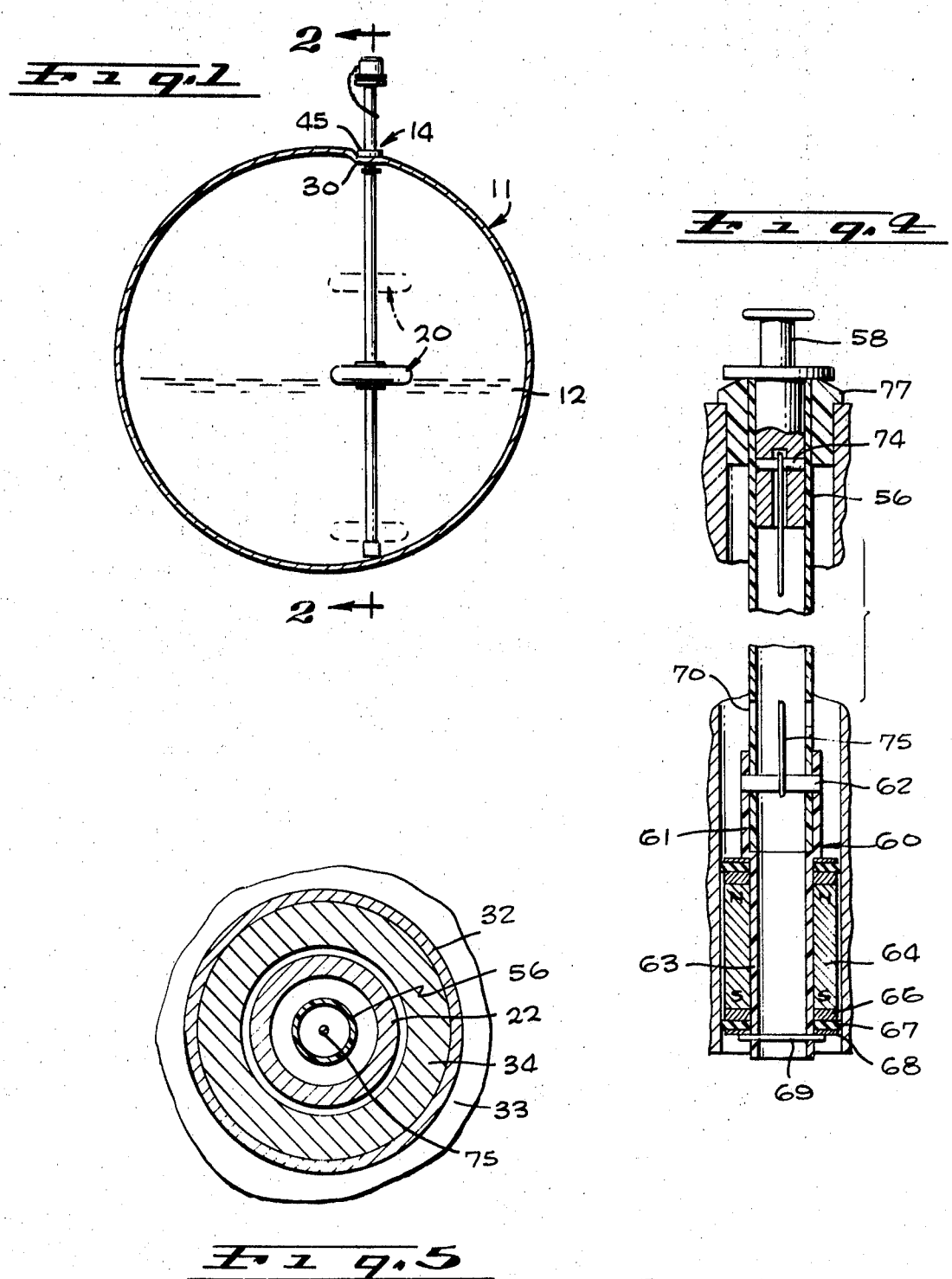
HENRY NUSBAUM
INVENTOR.
BY Mason & Graham
ATTORNEYS March 23, 1971
H. NUSBAUM
3,572,122
MEASURING STICK TYPE GAUGE
Filed July 28, 1969
2 Sheets-Sheet 2
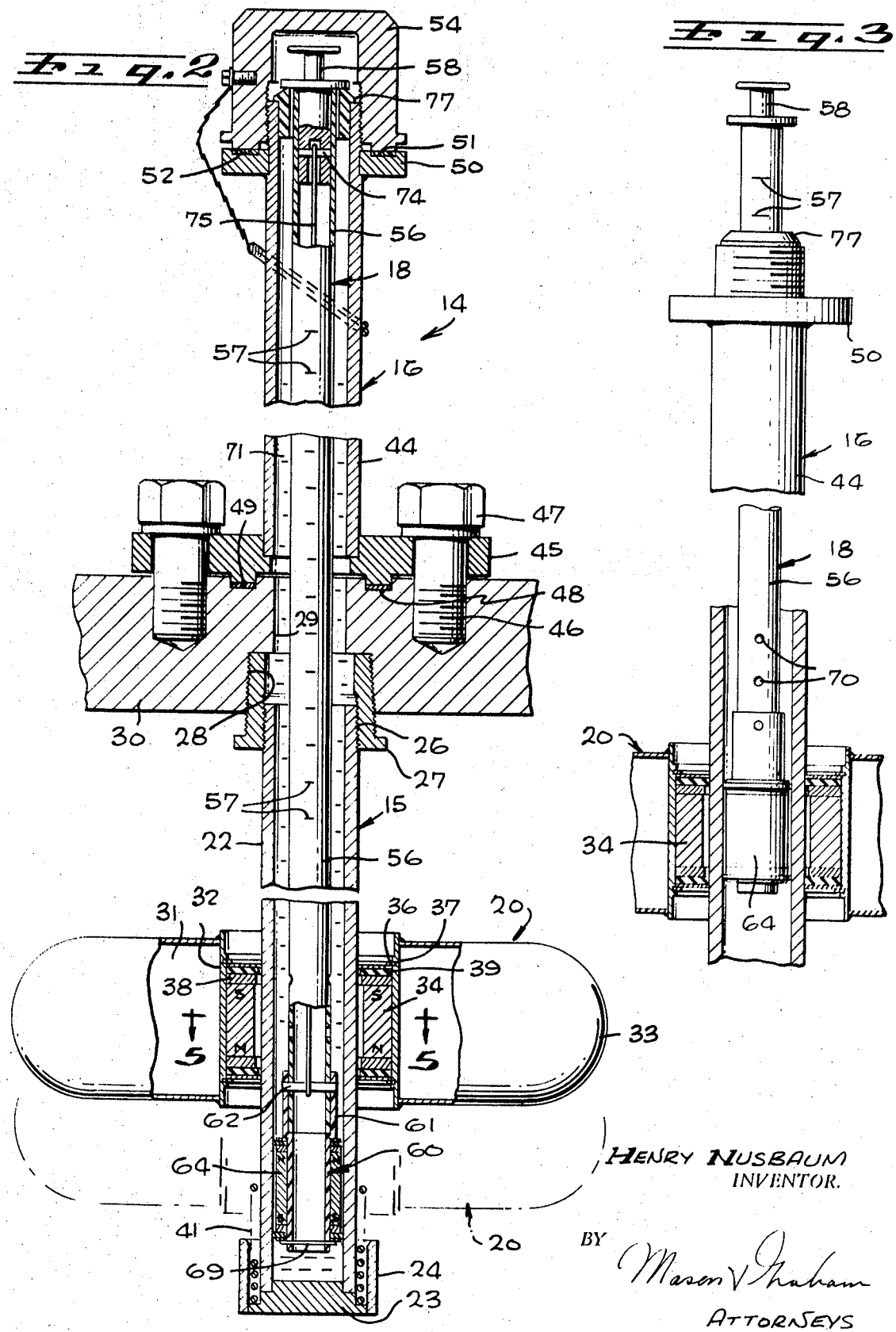
HENRY NUSBAUM
INVENTOR.
BY Mason V Graham
ATTORNEYS United States Patent Office 3,572,122
Patented Mar. 23, 1971

3,572,122
MEASURING STICK TYPE GAUGE
Henry Nusbaum, Los Angeles, Calif., assignor to
Roylyn Incorporated, Glendale, Calif.
Filed July 28, 1969, Ser. No. 845,191
Int. Cl. G01f 23/06
U.S. Cl. 73—314                                                    6 Claims

ABSTRACT OF THE DISCLOSURE

A gauge for determining the liquid level or quantity of liquid in a sealed tank in which a vertically movable measuring stick type gauge element is housed in a tubular assembly within the tank. The gauge is thus isolated from the contents of the tank. A float operable in the tank is provided on the exterior of the tubular assembly and includes a magnetic device for attracting, or magnetically latching, a particular section of the gauge element having a magnetic device thereon to the float for the purpose of orienting the element with respect to the float.

---

The invention relates generally to means for measuring the level of liquid in a tank and particularly to a measuring stick type of gauge element wherein there is access to the gauge element from the exterior of the tank but the element itself is not exposed to the contents of the tank, auxiliary means being provided to enable the operator to know how far to withdraw the gauge element to obtain a true indication of the liquid level.

A principal object of the invention is to provide novel gauge means for measuring the liquid level or determining the quantity of liquid in a tank or container, particularly gauge means designed for use with highly corrosive, volatile, or pressurized liquids and usable without opening the tank to the atmosphere so that no liquid or vapor can escape. In this connection it is an object to provide a novel gauge in which an elongated movable element corresponding to a measuring stick is isolated from the interior and the contents of the tank in which it is incorporated.

A further object is to provide gauge means embodying a novel elongated gauge element movable axially within a tubular housing mounted in a tank or the like together with novel means for partially supporting the gauge element and for eliminating condensation and icing on the interior surfaces of the tubular housing containing the gauge element under conditions when a substantial adverse temperature differential exists between the inside and outside of the tank.

A still further object is to provide gauge means embodying a tubular housing mounted vertically in a tank with a movable gauge element therein and a float on the outside thereof together with novel means for orienting the gauge element vertically with reference to the float.

Another object is to provide a novel gauge element including an elongated tube provided with magnetic means at its lower end adapted to be housed within a tubular housing mounted in a tank or other container and novel means for retrieving and removing the entire element as a unit from the housing in the event the tube breaks intermediate its ends.

By way of summary, the invention is concerned with the provision of a measuring stick-like gauge element in the form of a tubular member having magnetic means at its lower end and mounted for vertical movement in an outer tubular housing extending into a tank with the interior of the housing sealed off from the interior of the tank, in conjunction with a float on the outside of the tubular housing carrying means for magnetically attracting the magnetic means of the gauge element.

These and other objects will be apparent from the drawings and the following description. Referring to the drawings:

FIG. 1 is a cross sectional view of a tank showing gauge means embodying the invention mounted therein;

FIG. 2 is a fragmentary cross sectional view on line 2—2 of FIG. 1, but on a larger scale;

FIG. 3 is a fragmentary sectional view similar to FIG. 2, but showing the gauge element raised to magnetically latch with the float and thereby give an indication of the level of liquid in the tank;

FIG. 4 is a fragmentary longitudinal sectional view of the gauge element but on a larger scale; and FIG. 5 is a cross sectional view on line 5—5 of FIG. 2, but on a larger scale.

More particularly describing the invention, in FIG. 1, numeral 11 designates a tank, shown in cross section, which can be considered as capable of being closed and customarily containing a liquid 12 which may be highly corrosive. A gauge means 14 embodying the invention is shown mounted in the tank.

Referring now to FIGS. 2–5, the gauge means 14 includes generally an outer tube assembly or tubular gauge housing comprising a lower section 15 within the tank and an upper section 16 above and outside of the tank; a gauge element or inner tube assembly 18 that is mounted in but movable vertically with respect to the tubular housing; a float 20; and as will later be described, means for orienting the gauge element vertically with relation to the float.

The lower section 15 of the gauge housing includes a tube 22 which is closed at its lower end by a plug 23. The latter supports a short tubular section 24 that can be used for the attachment of a bracket (not shown) for anchoring the lower end of the gauge means to the tank when maximum rigidity is required.

At its upper end, tube 22 is threaded at 26 to receive a reducer fitting 27 which in turn is threaded into a counterbore 28 provided at the inner end of a bore 29 extending through a plate section 30 of the wall of the tank 11. Preferably all the metal parts which are exposed to the contents of the tank are formed of a metal which is highly resistant to corrosion, as for example, a suitable Monel alloy.

The float 20, which is designed to float upon the liquid in the tank and be guided by the tube 22, as it rises and falls, is generally annular in shape to receive the tube. The float has a hollow chamber 31 formed by a cylindrical inner wall 32 and wall means 33. Within wall 32 the float is fitted with an annular permanent magnet, or an assembly of individual magnets, designated 34, with the upper and lower ends being of opposite polarity as indicated by the letters "N" and "S." The magnet 34 is held in place by retainer rings 36 in suitable grooves 37 with washers 38 and Teflon bearings 39 sandwiched between each ring and the magnet, the bearings serving to ride upon the outer surface of tube 22.

A float support spring 41 rests on plug 23 and is contained partially within the tubular section 24 to cushion and limit downward movement of the float in the event the liquid in the tank should fall to a very low level.

The upper section 16 of the gauge housing comprises a riser tube 44 having a flange 45 welded thereto at its lower end which in turn is securely bolted to the wall section 30 of the tank by means of studs 46 and nuts 47. A seal 48 is provided in an annular groove 49. A flange 50 is welded to tube 44 a short distance below its upper end and is provided with an annular groove 51 containing a seal 52. Beyond the flange the tube is externally threaded to receive an internally threaded cap 54.

The gauge element or inner tube assembly 18 comprises an elongated plastic tube 56 preferably made of Fiberglas and suitably calibrated and provided with indicia 57 thereon to give the desired reading. The upper end of the tube is closed by a plastic knob 58 which is sealed in place. The lower end is open and fitted with a plastic sleeve 60. The upper end portion 61 of the sleeve fits over the lower end portion of the tube 56 and is held in place by a pin 62. The lower end portion 63 of the sleeve is reduced in diameter and serves to support an annular permanent magnet 64, the polarity of which is opposite to that of the magnet 34 of the float. The magnet is sandwiched between washers 66, Teflon or other suitable bearings 67 and washers 68. A cross pin 69 retains the assembly. The tube is apertured at 70 above the bearings for the purpose of providing a fluid bypass since it is preferred to fill or substantially fill the annular space between the gauge element and the tubular housing with an antifreeze solution 71.

The purpose of the antifreeze solution, which may be a standard one, such as a mixture of ethylene glycol and water, is to prevent freezing of condensate or rain on the inner walls of the gauge housing tube sections when the gauge is subjected to low temperature conditions since frozen particles may cause malfunction of the assembly. Also, the solution provides some buoyancy for the inner measuring tube assembly which permits use of a smaller float and smaller magnets and increases accuracy of the gauge.

The pin 62 is connected to a pin 74 in the knob 58 by a nylon or other suitable line 75 for the purpose of making it possible to remove the entire assembly in the event of accidental breaking of the tube 56.

In the use of the gauge, the level or quantity of liquid in the tank is determined by removing cap 54 from the top of the riser tube 44 and then raising the inner tube or gauge element 18 until the magnet 64 at the lower end thereof can be felt to be attracted by and in a sense magnetically latch with magnet 34 of the float. Since the float is free to move with the liquid level inside the tank, the position of the gauge element, after it has been positioned to magnetically latch with the float, is relative to the liquid level. The latter is then indicated by the graduated markings or indicia 57 on the gauge element which are read at the top surface of a guide bushing 77 in the top of the riser tube 44.

While it is preferable to use a permanent magnet or magnets in both the gauge element and the float in order to obtain maximum magnetic attraction, it is possible that a magnetic-type metal, such as iron or steel, might be used on one of the members and a magnet on the other.

I claim:

1. Gauge means responsive to the level of liquid in a tank, comprising a tubular housing mounted vertically in the tank and closed to the interior thereof but open at the top to the exterior, an elongated gauge element received in said housing and movable vertically therein by hand, a float member within said tank and guided by said housing for movement therealong, said gauge element and said tubular housing defining an annular space therebetween, an antifreeze solution substantially filling said annular space, a permanent magnet carried by said float, and a permanent magnet carried by the lower end portion of said gauge element.

2. Gauge means responsive to the level of liquid in a closed tank having an upper wall portion with an opening therein, comprising: an outer tubular housing assembly including a lower section within the tank closed at its lower end and an upper section rising above the tank, said sections being in vertical alignment and in registration with said opening and providing a continuous space from the top of said upper section through said opening to the bottom of said lower section, said opening being sealed around said outer tube assembly whereby no fluid can escape from the tank through said opening, an elongated gauge element within said housing and movable vertically therein, a float within the tank mounted on and guided by the lower section of said housing, said housing and said gauge element being so dimensioned as to provide an appreciable annular space therebetween, an antifreeze solution in said space, and magnetic means carried by said float and by the lower end of said gauge element, said float magnetic means being of sufficient strength noticeably to attract said gauge element when the same is moved to orient the magnetic means thereof opposite the magnetic means of the float and thereby releasably magnetically latch thereto.

3. The gauge means of claim 2 in which said gauge element comprises an elongated plastic tube provided with a sleeve at its lower end, a permanent magnet assembly mounted on the sleeve and plastic bearing means carried by said sleeve for engaging the interior walls of said housing, said gauge element being provided with a bypass means for liquid through the element to opposite ends of said bearing means.

4. The gauge means of claim 3 in which said sleeve is connected to the opposite end of said plastic tube by a line.

5. The gauge means set forth in claim 2 in which said upper section of the tubular housing tube is provided with a detachable cap.

6. The gauge means set forth in claim 2 in which the upper section of the tubular housing is detachably mounted on the tank.

References Cited

UNITED STATES PATENTS

| 1,642,656 | 9/1927 | Hull | 73—322 |
| 2,257,357 | 9/1941 | Watson | 73—126.4 |
| 2,598,835 | 6/1952 | Ryan | 73—314 |
| 3,127,955 | 4/1964 | Macks | 308—5X |
| 3,372,586 | 3/1968 | Chadwick | 73—171 |

FOREIGN PATENTS

| 682,141 | 2/1965 | Italy | 73—314 |

LOUIS R. PRINCE, Primary Examiner

D. M. YASICH, Assistant Examiner